Dec. 6, 1966    J. H. AUER, JR    3,290,489
APPARATUS FOR MEASURING VEHICULAR TRAFFIC PARAMETERS
Filed May 9, 1962    5 Sheets-Sheet 1

INVENTOR.
J. H. AUER JR.
BY
HIS ATTORNEY

Dec. 6, 1966 J. H. AUER, JR 3,290,489
APPARATUS FOR MEASURING VEHICULAR TRAFFIC PARAMETERS
Filed May 9, 1962 5 Sheets-Sheet 2

INVENTOR.
J.H. AUER JR.
BY
HIS ATTORNEY

Dec. 6, 1966  J. H. AUER, JR  3,290,489
APPARATUS FOR MEASURING VEHICULAR TRAFFIC PARAMETERS
Filed May 9, 1962  5 Sheets-Sheet 3

FIG. 5A  VEHICLE LENGTH DETECTOR

INVENTOR.
J. H. AUER JR.
BY
HIS ATTORNEY

3,290,489
APPARATUS FOR MEASURING VEHICULAR TRAFFIC PARAMETERS
John H. Auer, Jr., Rochester, N.Y., assignor to General Signal Corporation, a corporation of New York
Filed May 9, 1962, Ser. No. 193,406
19 Claims. (Cl. 235—150.24)

This invention relates to apparatus for measuring vehicular traffic parameters and, more particularly, relates to apparatus for measuring flow velocity and vehicle length. The subject matter of this application is related to that disclosed and claimed in my copending application Ser. No. 540,116, filed February 21, 1966, which is a continuation of Serial No. 301,941, filed August 9, 1963, which, in turn, is a continuation of my prior application, now abandoned, Serial No. 106,935, filed May 1, 1961, and the benefits of 35 U.S.C. 120 are claimed in this application with respect to any common subject matter.

It has been found necessary to analyze traffic conditions on highways so that remedial measures may be put into effect before traffic congestion exceeds certain predetermined maximum values since it has been found that, if these maximum values are exceeded, the ability of the highway to effectively move traffic is substantially reduced. Analysis of traffic conditions is also important in order to obtain a clear picture as to the use to which existing highways are being put so that there can be intelligent planning as to future highway needs. This makes it desirable to provide data as to traffic volume, flow velocity, occupancy, et cetera, and also makes it frequently desirable to classify vehicles as to their length so that there will be data available to show the percentage of traffic which comprises ordinary passenger cars, the percentage comprising trucks up to a certain length, and the percentage comprising long trucks, for example.

The prior art discloses how most of these factors can be determined by providing a different type of measuring apparatus for each desired parameter. Thus, it is well known that a Doppler speed detector may be used to obtain information as to vehicle velocity, and various types of vehicle counters are well known in the prior art and used to obtain a measure of the number of vehicles passing a measuring station. However, when it is desired that several of these factors be provided at the same location, it then becomes highly desirable to provide this data from essentially only one vehicle detector means rather than to provide a different means for each desired parameter. It is one aspect of this invention to provide apparatus which uses the same vehicle detection means to measure flow velocity and also provide an approximate measure of vehicle length, thereby permitting the classification of vehicles according to their individual lengths. The vehicle detector means which makes this possible is a so-called "presence" detector, by which is meant a detector that provides a continuous signal throughout the time required for a vehicle to pass through a given detection zone. Of course, it will be appreciated that the statment that only a single vehicle detection means is employed means that only one such vehicle detection means is required for any particular lane of vehicles and that ordinarily a separate detector is provided for each individual lane being monitored.

The factor of flow velocity already mentioned is similar, in a sense, to average vehicle velocity, and is an important factor since it provides an approximation as to the velocity of traffic flow past a given point. As will be shown, this factor is representative of the entire stream of traffic flowing past the detection location instead of being a measurement of the velocity of any individual vehicle in the stream.

In my copending application Serial No. 301,941 filed August 9, 1963, which is a continuation of my prior copending application Ser. No. 106,935, filed May 1, 1961 and assigned to the assignee of the present invention, I have disclosed and claimed a method and apparatus for measuring flow velocity. In this copending application, I have disclosed how a voltage analog may be generated whose overall duration is proportional, for each vehicle, to the length of time required for the vehicle to pass a given detection point. In other words, the vehicle presence detector which senses the time required for each vehicle to pass through a defined detection zone determines the duration of this voltage analog generated for the respective vehicle. The method and apparatus of the copending application also discloses how the aforesaid voltage analog is made to have a first predetermined higher value for a length of time which is dependent upon an assumed average vehicle length and is at a second predetermined lower value for the remainder of its duration. I have demonstrated mathematically in the aforesaid copending application that the average amplitude of successive such voltage analogs each generated in response to the passage of a respective vehicle, is proportional to flow velocity since $$V = \frac{L}{T}$$

where V is velocity, L is vehicle length and T is the time required for the vehicle to pass through the detection zone. With respect to any individual vehicle, the average amplitude of the analog generated in response to that vehicle is proportional to the actual speed of that particular vehicle only to the extent that the assumed average length equals the actual length of that vehicle and may, therefore, be substantially inaccurate. As already mentioned, however, the factor of flow velocity is concerned with the speed of traffic flow in general and it is, therefore, not necessary that vehicle length be measured individually for each vehicle since it can be safely assumed that, in a fairly large sampling of successive vehicles, the average length will quite closely approximate the assumed average length.

In a situation where all of the monitored vehicles are passenger cars, only one assumed average vehicle length need be provided. Of course, the results obtained are greatly in error when an appreciable part of the traffic monitored constitutes vehicles whose length varies substantially from the assumed average length as, for example, when the stream of traffic includes a large proportion of long trucks. It then becomes desirable to detect separately those vehicles such as trucks whose average length greatly exceeds the average length of automobiles so that the generated analog will then become a function of vehicle length as well, at least to a rough approximation. This refinement greatly increases the accuracy of measurement of flow velocity. In my copending application, I have shown that the greater height of a truck as compared to a passenger car can readily be detected by a vehicle presence detector and that the detection of a vehicle of greater height can be used as a reliable indication that the vehicle is also one whose length is greater than that of a passenger car. Of course, to the extent that the number of trucks or similar length vehicles in the monitored traffic stream can be predicted with reasonable accuracy, a single assumed vehicle length value can still be used although the value thus assumed will necessarily be greater than that employed when the vehicle stream includes, or is assumed to include, only passenger cars.

In my copending application Ser. No. 301,941 already referred to, I have disclosed the generation of a voltage analog whose overall duration is proportional to the duration of the output signal from the vehicle presence detector in response to each monitored vehicle and have also shown how this voltage analog is caused to be at a predetermined upper level for a length of time which is some predetermined relatively short time for each passenger car and some predetermined longer time for each passing truck, with the said short and longer times being, respectively, proportional to the assumed average lengths of a passenger car and truck. The method and apparatus of my copending application have been found to work entirely satisfactorily in practice, but it is also true that some complexities in timing are introduced by the requirement that the added increment of time throughout which the voltage remains at the upper level when a truck has been detected must not start until the initial interval, i.e., the time throughout which the voltage is at the upper level when a passenger car is detected, has fully terminated. On the other hand, by means of the present invention, these complexities in timing are entirely eliminated so that it becomes possible to eliminate also some of the apparatus which is otherwise required to accomplish this timing.

Described briefly, it is contemplated by the present invention to provide an operational amplifier of the type used in electronic analog computers and to provide at least two input signals thereto. One of these input signals is applied to the amplifier for a predetermined interval when any vehicle has been detected; the second input signal is applied to the amplifier throughout a length of time equaling the time required for a vehicle to pass through the detection zone. In the preferred embodiment shown in the drawings, a third input signal is applied to the amplifier when any high vehicle is detected to account for the assumed greater length of such high vehicle. The output signal of this operational amplifier has an amplitude proportional to flow velocity. As will be shown, there is no need in the present invention that there be no overlapping between the several input signals, and this provides for a considerable simplification of the apparatus.

In the prior copending application Ser. No. 78,410 of H. C. Kendall and Jack H. Auer, Jr., there is disclosed a method and apparatus for measuring vehicle length. This means is responsive jointly to a first analog which is proportional to the actual measured velocity of each monitored vehicle and to a second analog which is proportional to the time required for the monitored vehicle to pass through the given detection zone. These two analogs are multiplied together and since vehicle length is equal to velocity multiplied by time required to pass a given point, the output analog has an amplitude which is proportional to vehicle length.

In the present invention, there is disclosed a method and apparatus for measuring vehicle length which does not use a speed signal measured directly in response to the vehicle whose length is to be determined but rather uses the measured flow velocity parameter already described herein. Integration of this analog representing flow velocity over the time required for the particular vehicle to pass through a detection zone provides an output analog signal proportional to the length of the then-monitored vehicle. It is recognized that the flow velocity previously derived is dependent for its accuracy upon an assumed average vehicle length and that it is this particular factor of vehicle length which is itself sought to be determined. Nevertheless, to the extent that the average length of a large number of vehicles closely approximates the assumed average length, the flow velocity will tend to be quite accurate and, further, to the extent that an individual vehicle is travelling with its velocity relatively close to the measured flow velocity, the duration of the interval required for it to pass through the detection zone, taken in conjunction with the measured flow velocity, will provide a reasonably accurate measurement of vehicle length. Vehicle length measured in this way cannot be a highly accurate measure and thus should not be used when it is desired to measure lengths of vehicles with an accuracy of less than one foot. However, when a classification of vehicle lengths is desired so that vehicles of less than 17-foot length can be segregated from those whose length falls in the range of 17–30 feet, for example, and with these, in turn, segregated from those whose length exceeds 30 feet, the apparatus of this invention will readily provide this degree of discrimination.

It is an object of the present invention to provide traffic data parameters of flow velocity and vehicle length employing only a vehicle presence detector as the vehicle responsive element.

It is another object of this invention to disclose a method for the measurement of flow velocity of traffic using an operational amplifier.

It is a further object of this invention to disclose a method for classifying vehicles according to length, which method involves the integration of an analog proportional to flow velocity over the length of time required for a vehicle to pass through a detection zone.

It is another object of the invention to provide apparatus for automatically classifying vehicles passing along the highway according to their length and which operates according to the aforesaid method.

Other objects, purposes, and characteristic features of this invention will, in part, be obvious from the accompanying drawings and, in part, pointed out as the description of the invention progresses.

In the drawings, the symbols (B+) and (B—) represent voltage sources of positive and negative polarities, respectively, and the symbol for a ground connection indicates an intermediate tap between the positive and negative terminals. In describing the invention in detail, reference will be made to the accompanying drawings in which like reference characters designate corresponding parts throughout the several views, and in which.

GENERAL DESCRIPTION

It is deemed desirable to describe first what is meant by the term "flow velocity." Flow velocity is a measure of the level of speed at which successive vehicles pass a monitoring point. Flow velocity may be represented by a voltage whose amplitude is proportional to flow velocity and is a continuously variable quantity, being constantly available for measurement. The flow velocity figure can vary only slowly and thus is not appreciably affected if, in the stream of traffic being monitored, an occasional vehicle has its velocity differing substantially from that of the majority of vehicles. Of course, if a number of successive vehicles all move at a substantially higher speed, for example, then the quantity representing flow velocity will gradually change until finally it represents the higher speed of such vehicles. Under ordinary conditions, where vehicles pass in relatively rapid succession, the flow velocity measured is quite closely proportional to average vehicle velocity.

Figure 1A:
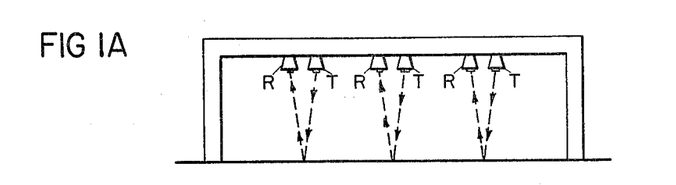
FIGURES 1A and 1B illustrate a possible arrangement of vehicle detection apparatus over the adjacent lanes of a highway.
Figure 1B:
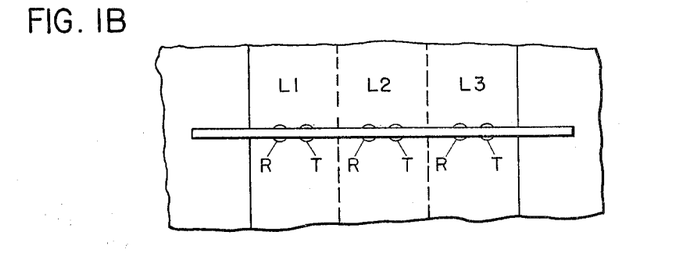

FIGURES 1A and 1B illustrate a possible arrangement of the vehicle detection apparatus, including the electroacoustic transducers which may be used for each of three parallel highway lanes when the vehicle detection apparatus is of the pulsed ultrasonic type. In a vehicle detection system of this type, which is disclosed in detail in Kendall et al., Patent No. 3,042,303, issued July 3, 1962, repetitive sound pulses, each of short duration such as one millisecond, are transmitted downwardly from a transmitting transducer T toward the pavement and impinge, in the absence of any vehicle, upon the surface of the roadway. They are then reflected back toward a receiving transducer R. When a vehicle intercepts the relatively narrow beam of sound pulses, the sound pulses can no longer impinge upon the pavement but then impinge upon the upper sound reflecting surfaces of the vehicle. Incidentally, the repetition rate of the pulses is sufficiently slow to provide enough time between successive pulses to permit each reflected pulse to be received by the receiving transducer before the next sound pulse is transmitted. This latter requirement eliminates ambiguity since each reflection pulse is then definitely related to the last-transmitted sound pulse.

The round-trip propagation time of a reflection pulse is affected considerably by whether or not there is a vehicle present within the sound beam. When no vehicle is present, each sound pulse has a maximum propagation time, but when a vehicle is present the propagation time is considerably reduced. This difference in propagation time makes it possible to distinguish between pavement and vehicle reflection pulses and thereby detect that a vehicle is within the sound beam. Since the detected condition persists as long as the vehicle occupies the sound beam, the duration of this condition represents the length of time required for a vehicle to pass the detection location defined by the sound beam.

Figure 2:
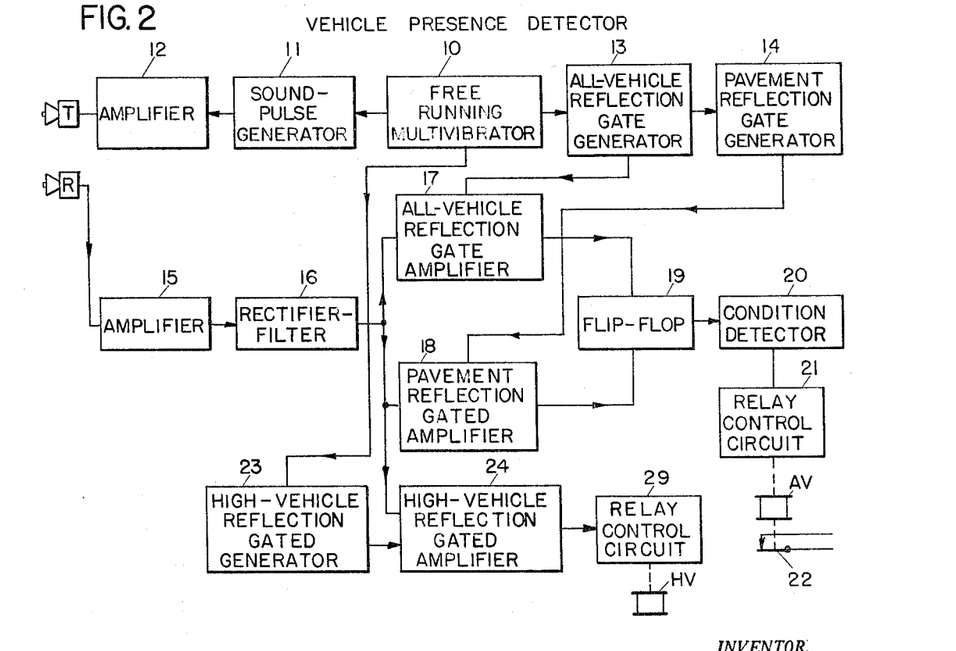
FIGURE 2 illustrates, in block form, a vehicle presence detector which also classifies passing vehicles according to their height.

VEHICLE PRESENCE DETECTOR—FIGURE 2

In FIGURE 2, the apparatus provided for generating the repetitive sound pulses comprises a free-running multivibrator 10 whose frequency of operation establishes the pulse repetition rate. For each cycle of its operation, the multivibrator 10 applies a triggering pulse to the sound pulse generator 11. The generator 11 then produces a brief pulse of ultrasonic frequency energy which is amplified by amplifier 12 and applied to the transmitting transducer T, thereby causing a corresponding sound pulse to be transmitted toward the pavement. Electronic gating circuits are employed and each demarcates a successive time interval, with the first of these being driven by multivibrator 10. The first of these gating circuits, the all-vehicle reflection gate generator 13, demarcates a time interval which encompasses that period of time after the transmission of each sound pulse when a reflection of that pulse can be expected to be received from any vehicle irrespective of its height. The high vehicle reflection gate generator 23 demarcates an interval of time which overlaps that demarcated by the gate generator 13 but encompasses only the expected time reception of a reflection pulse from a high vehicle, i.e. one whose height is substantially above that of the average passenger car. Another subsequent time interval is demarcated by the pavement reflection gate generator 14 and encompasses the interval of time during which a pavement reflection can be expected to be received.

The reflection pulses are all amplified by amplifier 15, and after being rectified and filtered by the rectifier-filter 16, are applied to the all-vehicle reflection gated amplifier 17, the high-vehicle reflection gated amplifier 24, and the pavement reflection gated amplifier 18. These gated amplifiers are, respectively, gated by the voltage derived from the gate generators 13, 23 and 14 previously referred to. As a result, when no vehicle is present, each reflected sound pulse results in a corresponding output from the pavement reflection gated amplifier 18, and this output is then applied to one input of flip-flop 19. When any vehicle is within the sound beam, each reflected sound pulse produces an output from the gated amplifier 17, and this output is then applied to the other input of flip-flop 19.

As long as flip-flop 19 receives successive input pulses from amplifier 18, it remains in a first one of its two stable states. Therefore, it remains in such first state as long as no vehicle is within a sound beam. Flip-flop 19 is operated to its opposite state, however, when a vehicle is within a sound beam so that it receives successive input pulses from amplifier 17 instead of from amplifier 18.

Condition detector 20 is connected to flip-flop 19 and senses which of its two states flip-flop 19 is in at any time. Whenever condition detector 20 senses that flip-flop 19 is in the condition it assumes whenever it is constantly receiving output pulses from amplifier 18, it then acts upon relay control circuit 21 to cause relay AV to be picked up so that front contact 22 of this relay is closed. On the other hand, when condition detector 20 is in the opposite of its two states by reason of having sensed that flip-flop 19 is in the condition it necessarily assumes whenever it receives successive pulses from amplifier 17, then relay control circuit 21 is operated to the condition where relay AV is dropped away. At such time, front contact 22 of relay AV is open.

From this description, it can be seen that the vehicle detector described in FIGURE 2 is of the type which is a "presence" detector in that relay AV is picked up throughout the time that a vehicle is detected as being within the sound beam. The various component values affecting the time constants associated with this detector are so chosen that the response and release times for relay AV will be substantially identical. This is done so that the pick-up time of relay AV will tend to be closely proportional to the length of time that the vehicle is within the sound beam.

Another distinctive characteristic of the vehicle detector of FIGURE 2 is that it provides a high degree of discrimination against spurious objects. More specifically, in order for a vehicle to be detected, it is first necessary that the normally received pavement reflections be no longer received and that concurrently therewith vehicle reflection pulses be received. Before the apparatus can be restored to its normal condition so that it can thereafter detect a subsequent vehicle, it is necessary that the vehicle reflections cease and that the pavement reflection again be restored. These multiple requirements ensure that only a vehicle will ordinarily provide operation of the detector relay AV. Moreover, a convertible auto having sound reflecting surfaces only at its front and rear deck portions cannot possibly be counted as two separate vehicles, since the absence of pavement reflection pulses when the cloth top is within the sound beam prevents the detector relay from dropping away. These characteristics of the vehicle detector of FIGURE 2 are fully set forth in Patent No. 3,045,909 issued July 24, 1962 which may also be referred to for a more detailed description of the mode of operation of flip-flop 19, condition detector 20, and relay control circuit 21.

Whenever a high vehicle passes the detector location, the pulse which is applied to gated amplifier 24 occurs during the time that this amplifier is receiving its gating voltage from the gated generator 23. Because of this, each such input pulse results in the application of a corresponding output pulse to the relay control circuit 29. When a predetermined plurality of such pulses have been applied to relay control circuit 29 in close succession, this relay control circuit is operated to a distinctive condition wherein the high vehicle relay HV is dropped away.

Although the vehicle detector of FIGURE 2 is disclosed as being of the pulsed ultrasonic type, it is to be emphasized that it is by no means essential that a vehicle detector of this particular type be used to practice the present invention. It is only necessary that the detector be generally of the type which will provide an output for each vehicle whose duration is proportional to the length of time that the vehicle requires to pass a given point.

Figure 3:
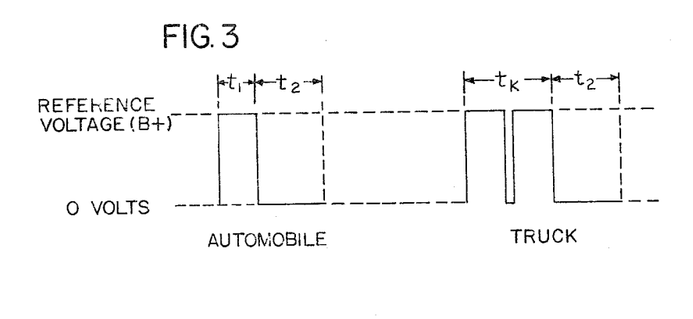
FIGURE 3 is a waveform diagram illustrating the generation of a voltage analog for use in measuring flow velocity in accordance with the prior art teaching of my copending application Ser. No. 301,941.

In my copending application Ser. No. 301,941, I have disclosed how a wave-form may be generated having the characteristics shown in FIGURE 3, and how the average amplitude of this voltage analog over a measuring interval is proportional to the flow velocity of the traffic being monitored. When no vehicle is being detected, no voltage is applied to the averaging circuit, but when a vehicle passes through the detection zone, a reference voltage, for example, the (B+) supply voltage as indicated in FIGURE 3, is applied for a fixed length of time $t_1$. After time $t_1$ has elapsed, and assuming that the vehicle detected is a passenger car, the voltage is then immediately dropped to a lower value, which may be the zero voltage level, and the length of time that it remains at this lower level is a function of the time that it takes the vehicle to pass through the detection zone since the sum of times $t_1$ and $t_2$ equals the time required for the vehicle to pass through the detection zone. At the end of time $t_2$, the zero voltage which has been applied to the averaging circuit is removed, and no voltage is thereafter applied to the averaging circuit until the next vehicle is detected.

The average value of the voltage analog shown in FIGURE 3, $E_{AV}$, is shown in the previously-mentioned application Ser. No. 301,941 to equal the reference voltage, i.e., the (B+) supply voltage, multiplied by the ratio of time $t_1$ to the sum of times $t_1+t_2$ or:

$$E_{AV} = E_{REF} \frac{(t_1)}{t_1+t_2}$$

Since $t_1 = k_1$, a constant, and $t_1+t_2 = T$, the total occupancy time:

$$E_{AV} = E_{REF} \frac{k_1}{T}$$

Since vehicle velocity $$S = \frac{L}{T}$$

where L equals vehicle length and T equals occupancy time, it follows that it is then only necessary for $E_{REF} \cdot k_1$ to be proportional to vehicle length L in order that $E_{AV}$ will be proportional to vehicle speed S. If a single average vehicle length value is assumed, both $E_{REF}$ and $k_1$ may be so selected if desired that $E_{AV}$ in volts will equal velocity in miles per hour; however, where such 1:1 correspondence between $E_{AV}$ and S is not required, any convenient values of $E_{REF}$ and $k_1$ may be selected (it being only necessary that $k_1$ be less than the minimum expected value of T), and the only difference is that a different scale factor between $V_{AV}$ and S will result. Insertion of the proper scale factor at the output of the apparatus, if desired, will bring the output voltage amplitude of the apparatus into 1:1 correspondence with the speed parameter S.

Under the assumed conditions where each vehicle has a length equal to the assumed average length, then the average amplitude of the voltage analog generated for each vehicle is proportional to the velocity of the respective vehicle.

Of course, for any vehicle whose length differs from the average assumed length, the relationship between $E_{AV}$ and S does not hold true. Thus, in any random sampling of vehicles, the length of any individual vehicle may differ quite appreciably from the assumed average length. However, by causing the averaging circuit to have a relatively slow response time quite accurate results will be obtained since the average length for the cars in the sample will closely approximate the assumed lengths.

When conditions are such that an appreciable percentage of the passing vehicles have a length differing substantially from the assumed single value, the measured flow velocity becomes inaccurate. This is the situation that arises when the traffic includes an appreciable number of trucks, especially trailer trucks whose length is several times that of an automobile. It then becomes necessary to distinguish between trucks and other vehicles and to cause the product $E_{REF} \cdot k$ to assume a different value for each truck; unless, of course, a statistical or other prediction may be made as to the number of trucks or similar length vehicles which appear in the traffic stream, in which event a single fixed value of $E_{REF} k_1$ may be used. Generally, it is more convenient to vary $k_1$ than $E_{REF}$. Thus, if the new value of $k_1$ is designated as $k_t$, then:

$$\frac{k_t}{k_1} = \frac{L_t}{L_a}$$

where $L_t$ is the assumed average length of a truck and $L_a$ is the assumed average length of a passenger car.

Figure 4:
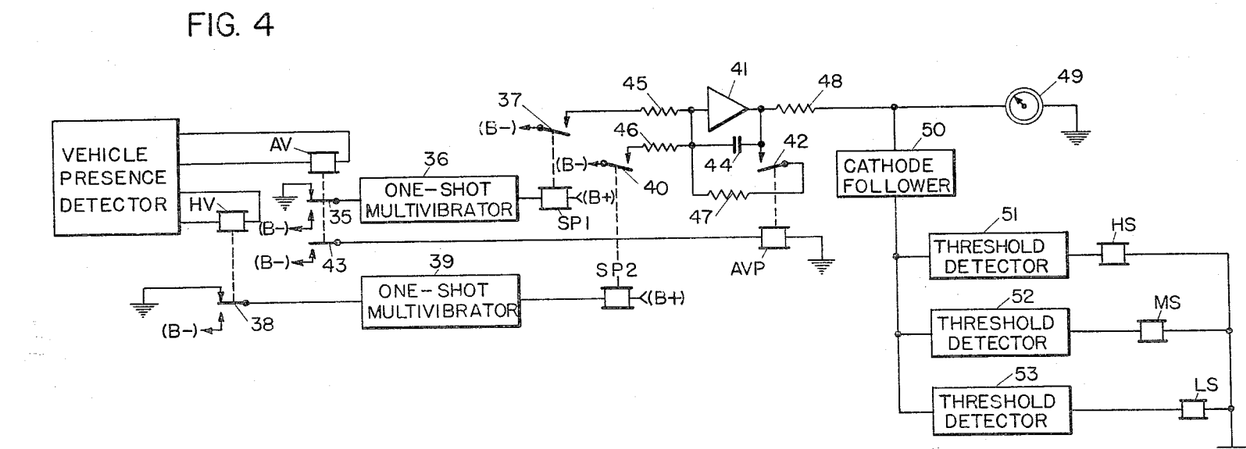
FIGURE 4 is a circuit diagram illustrating apparatus for the measurement of flow velocity.

When a high vehicle is detected by the presence detector, relay HV is dropped away in addition to relay AV. When this occurs, normally closed front contact 38 of this relay, which ordinarily connects the input of one-shot multivibrator 39 to ground, is instead connected to the (B−) terminal so that multivibrator 39 is operated to the abnormal state for a predetermined time interval $t_t$ such that $t_1+t_t=t_k$. In other words, the sum of the picked-up times for relays SP2 and SP1 when a high vehicle has been detected, exceeds the picked-up time of relay SP1 (which alone is picked up when a low vehicle or passenger car has been detected) by an amount which is proportional to the assumed difference in length between an average truck and an average passenger car.

As will be shown, there is no necessity that the actuation of relay SP2 follow that of relay SP1; instead, both relays SP1 and SP2 may, and ordinarily will, pick up substantially at the same time when a high vehicle has been detected. This comes about as a result of the fact that these relays are controlled respectively by multivibrators 36 and 39, which, in turn, are both operated from their normal conditions by the dropping away of relays AV and HV respectively.

The operational amplifier 41 is responsive not only to the contacts 37 and 40 of relays SP1 and SP2 respectively, but also to front contact 42 of relay AVP. Relay AVP is a repeater of relay AV and is picked up to close front contact 42 whenever relay AV is dropped away, thereby energizing relay AVP through back contact 43 of relay AV.

Referring now to the operational amplifier 41 itself, when no vehicles are being detected, all of the input and resistive feedback circuits of the amplifier are open so that the amplifier with its parallel capacitor 44 operates as an analog storage device. Thus, since the grip current is negligible, and since the input and resistive feedback circuits are open, the charge on capacitor 44 cannot change. The output voltage of the amplifier, therefore, assumes substantially the voltage across capacitor 44 since it is only then that the voltage at the amplifier summing point will be substantially zero.

When a vehicle is detected, and assuming that this vehicle is a low vehicle so that only relay AV, but not relay HV, is actuated, front contact 37 of relay SP1 will close for a predetermined time interval, thereby causing a negative charge to be applied through resistor 45 to the amplifier summing point throughout the length of time that relay SP1 is picked up. If the detected vehicle is a high vehicle so that relay HV also is actuated, relay SP2 will pick up as well as relay SP1 and a negative charge will then additionally be applied to the amplifier summing point through closed front contact 40 of relay SP2 and resistor 46 throughout the time that relay SP2 is picked up.

Relay AVP is picked up for a length of time which is not fixed, but is proportional to the length of time T required for the vehicle to pass through the detection zone. Since the amplifier output is of positive polarity, this means that a positive charge is applied to the summing point through front contact 42 and through feedback resistor 47 for the time T.

The positive and negative charges applied to the summing point in the manner just described are each a product of the current applied through the respective path and the time of application of such current. To the extent that the positive and negative charges do not balance each other, the difference is applied to or removed from capacitor 44, hereby resulting in a net change in the output voltage of the amplifier.

Assume that the charges flowing to the summing point through the contacts of relays SP1, SP2, and AVP may be represented respectively by $Q_{SP1}$, $Q_{SP2}$, $Q_{AVP}$, and that $\Delta Q_c$, represents the net change in the charge or capacitor 44, and if it is further assumed that the amplifier grid current is zero (which is substantially correct and is a conventionally made assumption), then $$Q_{SP1} + Q_{SP2} + Q_{AVP} + \Delta Q_c = 0$$

Furthermore, the following equalities are apparent:

$$Q_{SP1} = I_{SP1} \cdot T_{SP1} = \frac{E_{REF}}{R_{45}} \cdot T_{SP1}$$

$$Q_{SP2} = I_{SP2} \cdot T_{SP2} = \frac{E_{REF}}{R_{46}} \cdot T_{SP2}$$

$$Q_{AVP} = I_{AVP} \cdot T_{AVP} = \frac{+E_0}{R_{47}} \cdot T_{AVP}$$

$$\Delta Q_c = C_{44} \cdot \Delta E_0$$

where $R_{45} = R_{46}$ = the resistance of resistors 45 and 46; $T_{SP1}$, $T_{SP2}$, and $T_{AVP}$ are the times throughout which relays SP1, SP2 and AVP, respectively, are picked up; $I_{SP1}$, $I_{SP2}$, and $I_{AVP}$ are the currents flowing through the contacts of relays SP1, SP2, and AVP, respectively; $E_0$ is the amplifier output voltage; $Q_c$ is the charge on capacitor 44; $C_{44}$ is the capacitance of capacitor 44; and $R_{47}$ is the resistance of resistor 47.

By substitution:

$$+\frac{E_{REF}}{R_{45}} \cdot T_{SP1} + \frac{E_{REF}}{R_{45}} \cdot T_{SP2} + \frac{E_0}{R_{47}} \cdot T_{AVP} + C\Delta E_0 = 0$$

Assuming, for the purposes of analysis, that a succession of vehicles all of identical lengths and heights pass the detector with identical speeds a series of identical operations of relays SP1, SP2 and AVP will occur. After a number of such identical operations, the output voltage of amplifier 41 will reach an equilibrium level at which the negative charge applied each time through relays SP1 and SP2 will equal the positive charge applied through relay AVP. When this equilibrium condition has been reached, the amplifier output voltage $E_0$ and charge $Q_c$ on capacitor 44 are the same after each vehicle leaves as they were before such vehicle was detected. Therefore, for the complete passage of each vehicle, $\Delta E_0 = 0$. When this equilibrium is reached, the value of $E_0$ may be determined by setting $\Delta E_0$ in the last equation equal to zero and solving for $E_0$.

Thus:

$$E_0 = -E_{REF} \frac{(R_{47})}{R_{45}} \left( \frac{T_{SP1} + T_{SP2}}{T_{AVP}} \right)$$

By comparison of this expression for $E_0$ with that for $E_{AV}$ previously referred to, it will be seen that $E_0$ is proportional to flow velocity.

The various constants with expressions for $E_0$ may be selected to result in a value of $E_0$ in volts that numerically equals flow velocity in miles per hour.

The output voltage of amplifier 41 is applied through resistor 48 to meter 49 which may be calibrated to read in terms of miles-per-hour of flow velocity. Alternatively, or additionally, the output voltage of the amplifier may be applied to a cathode follower 50 whose output will then be applied to any desired number of threshold detector circuits 51, 52 and 53, each of which controls the energization of a respective relay HS, MS and LS. The circuit organization of such a threshold detector is well known in the art and need not be described in detail here. Briefly, each may comprise an amplifier whose bias voltage is adjusted so that sufficient current will be provided to actuate the associated relay only when the output voltage of cathode follower 50 exceeds a particular value. Thus, threshold detector 51 may have its bias voltage so adjusted that relay HS will pick up only for a relatively high level of output voltage of cathode follower 50 corresponding to a relatively high value of flow velocity. Detectors 52 and 53 may each have their bias voltages so adjusted that relay MS, for example, will pick up when the flow velocity exceeds some particular medium value, and relay LS only for flow velocity values which exceed some predetermined lower value.

Figure 5A:
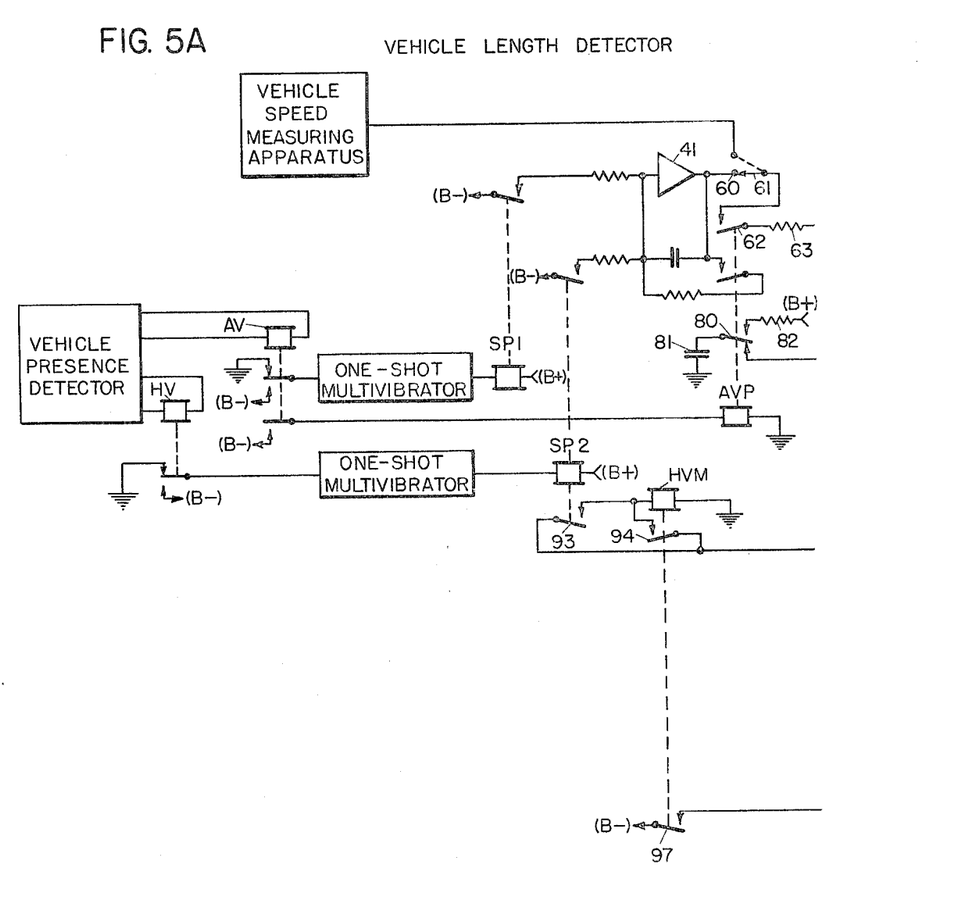
FIGURES 5A and 5B are a circuit diagram illustrating apparatus for classification of vehicles according to length.
Figure 5B:
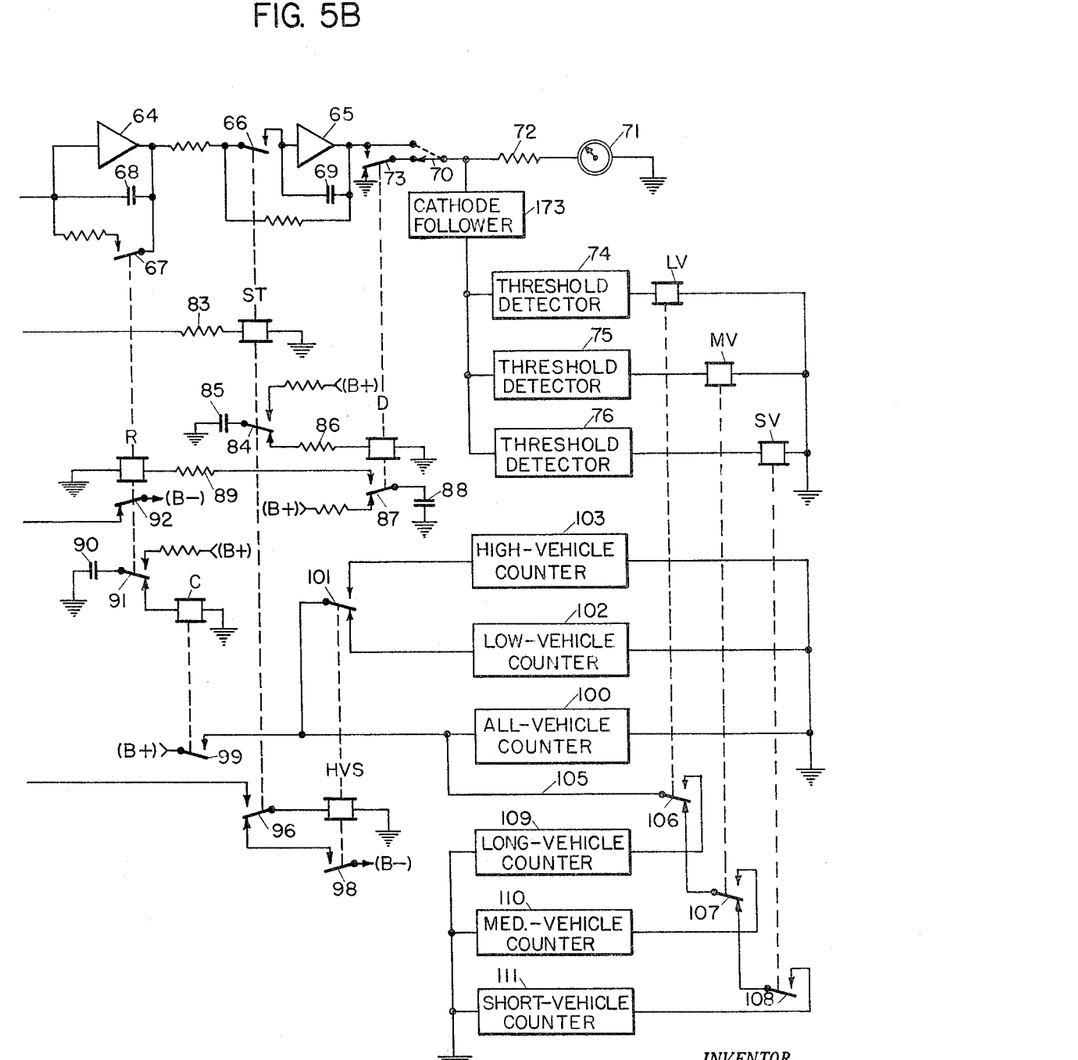

FIGURES 5A and 5B show the circuit organization of the vehicle length detector of this invention. This apparatus incorporates the flow velocity measuring apparatus of FIGURE 4 but, since flow velocity is usually made continuously available whereas vehicle length is discretely measured for each passing vehicle, it becomes necessary in the measurement of vehicle length to provide means which will provide discrete output signals. The apparatus shown in FIGURE 5 incorporates this feature and, moreover, provides for the classification of the vehicle length output signals according to predetermined vehicle length classifications, and the apparatus also provides for the separate counting of vehicles according to their length classification.

The apparatus of FIGURE 5 includes the vehicle presence detector, relays AV, HV, AVP, SP1 and SP2 which are all identical to the corresponding elements of FIGURE 4. Moreover, the amplifier 41 and its input and feedback circuits are also identical to those of FIGURE 4. Accordingly, there is available at the output of amplifier 41 a voltage whose amplitude corresponds to the flow velocity of the traffic being monitored.

In order to obtain vehicle length, it is necessary to integrate vehicle speed over individual vehicle occupancy time. More specifically, the present invention contemplates the use of the flow velocity parameter rather than individually measured vehicle velocity, and the flow velocity signal is integrated over the occupancy time for each vehicle as measured by the vehicle presence detector.

The output of operational amplifier 41 is applied through contact 60 of the two-position switch contact 61 and through front contact 62 of relay AVP and resistor 63 to the summing point of operational amplifier 64. Amplifier 64 is connected to operate as an integrator and integrates the flow velocity signal from amplifier 41 over the length of time that contact 62 of relay AVP is closed, i.e. over the occupancy time T of that vehicle. Therefore, the output voltage of amplifier 64 has an amplitude representative of vehicle length.

Amplifier 65 is a storage amplifier which stores the output signal of amplifier 64 when the integration has been completed as denoted by the picking up of relay ST and the closing of its front contact 66. When the signal has been stored in amplifier 65, amplifier 64 becomes available for integration of the flow velocity signal during occupancy time T of the next following vehicle. Prior to the arrival of such next vehicle, however, relay R will have picked up as will subsequently be shown and its front contact 67 will have closed momentarily, thereby discharging the integrating capacitor 68, and, in effect, erasing the previously-stored output signal of amplifier 64.

When relay ST is energized, the output of amplifier 65 is brought into agreement with the output of amplifier 64. When relay ST subsequently releases and opens its front contact 66, capacitor 69 connected between the output and summing points of amplifier 65 stores the last vehicle length signal until relay ST is again picked up by another following vehicle. At such time, the output voltage of amplifier 65 is again brought into agreement with the output of amplifier 64.

Relay D is energized for an interval of approximately one second following completion of the transfer into storage amplifier 65 of the last-measured vehicle length. The way in which relay D is controlled will subsequently be described. If the two-position switch contact 70 is in the position shown, the meter 71 will normally be connected through resistor 72 and through contact 70, as well as through back contact 73 of relay D, to ground, and will be connected to the output of storage amplifier 65 only during the one-second interval throughout which relay D is picked up after a vehicle is detected. Therefore, meter 71 will be energized so as to display the last-measured vehicle length only momentarily. If, on the other hand, switch contact 70 is in the upper position, meter 71 will, at all times, be connected to the output of amplifier 65 and will then continually be energized, reading at all times the last vehicle length signal which has been obtained. In any event, it will be understood that meter 71 can be calibrated to read vehicle length in feet.

The output of amplifier 65 is also applied through a cathode follower 173 to the input circuits of a plurality of threshold detectors 74, 75 and 76. These threshold detectors control relays LV, MV and SV, respectively. The threshold detectors may be similar to the threshold detectors of FIGURE 4 in that each will cause the associated normally dropped away relay to pick up only when the output voltage provided by cathode follower 173 rises above some predetermined value. Relay SV, therefore, may be controlled to pick up when the vehicle length signal provided by amplifier 65 indicates that the last-monitored vehicle was a relatively short vehicle such as the ordinary passenger car. Threshold detector 75 may be adjusted to pick up relay MV for vehicles whose length exceeds that of passenger cars so that this relay will pick up for medium length trucks and longer vehicles. Relay LV may be controlled by detector 74 so that it will only pick up in response to the passage of a vehicle of quite substantial length such as a long truck.

Figure 6:
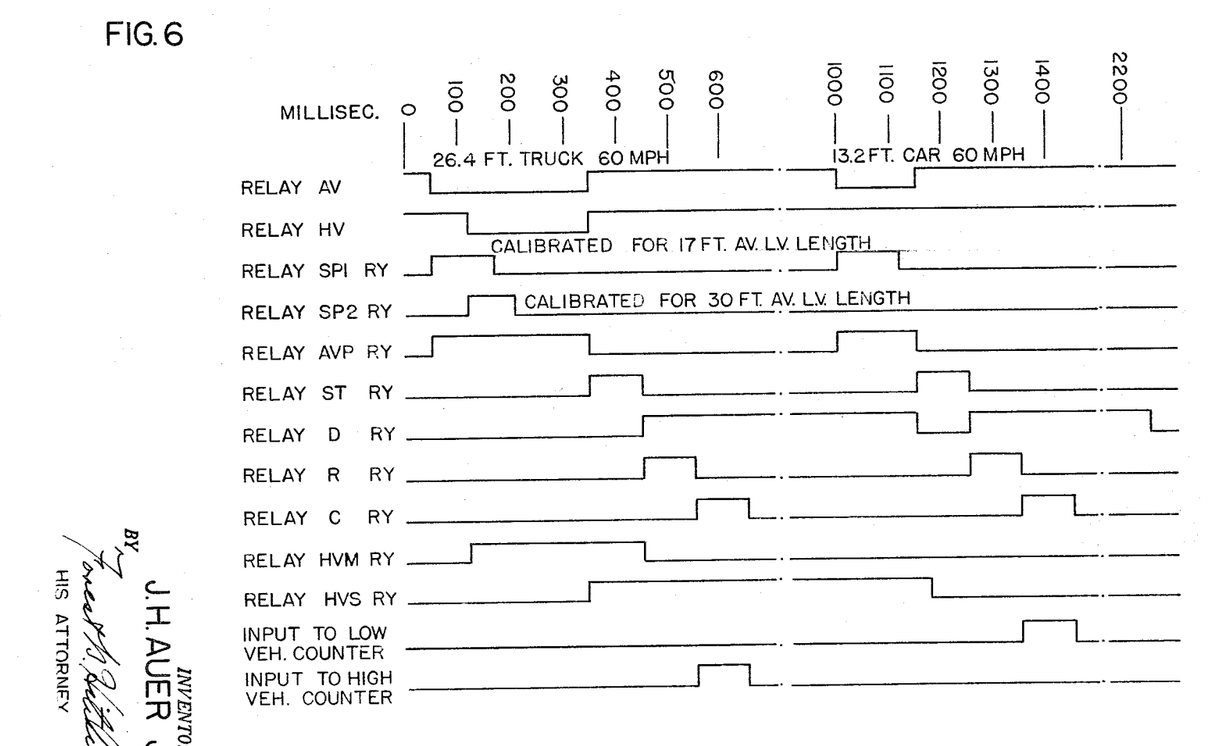
FIGURE 6 is a timing diagram illustrating the operation of the various relays of FIGURE 5.

When more accurate vehicle length measurement is desired, contact 61 may be operated to the dotted line position shown in FIGURE 5A so that actual measured vehicle speed instead of the flow velocity signal may be used. The input signal then applied to amplifier 64 when contact 62 of relay AVP is closed, is then closely proportional to the actual speed of the vehicle whose length is to be determined. The vehicle speed measuring apparatus shown may be of any known type. A description will now be presented as to the mode of operation of the various relays shown in FIGURE 5. Reference should also be made to FIGURE 6 which graphically illustrates their sequential operation. Relay AVP is picked up throughout the length of time required for any vehicle to pass through the vehicle detection zone. When this relay picks up, its front contact 80 closes, thereby charging capacitor 81 through current-limiting resistor 82. When relay AVP drops away, back contact 80 closes and this permits capacitor 81 to discharge through resistor 83 and the winding of relay ST so that relay ST is picked up. As shown in FIGURE 6, the time constant of the discharge circuit is such that relay ST will be picked up for an interval of approximately 100 milliseconds starting with the time of release of relay AVP.

When relay ST picks up, its front contact 66 closes as already mentioned so that the vehicle length signal then appearing at the output of integrating amplifier 64 can be applied to the summing point of amplifier 65. Another effect of the picking up of the relay ST is the closure of its front contact 84 thereby charging capacitor 85. When relay ST drops away at the end of the 100 millisecond interval just mentioned, capacitor 85 then discharges through resistor 86 and the winding of relay D. The time constant of this discharge circuit is made quite long so that relay D will remain picked up for approximately one second as indicated in FIGURE 6, thereby providing sufficient time for the selective actuation of one of the relays LV, MV or SV and providing also sufficient time for the enerigization of meter 71 and the visual reading of the indication provided by this meter. The first D relay operation shown in FIGURE 6 is cut short at time 1150 with a duration of only 0.7 seconds by the picking up of the ST relay upon arrival of the following vehicle. Thus when vehicles are close enough together to prevent length display for one full second, the display is accordingly shortened automatically.

Before relay D picks up, its back contact 87 is closed so that capacitor 88 can become fully charged. When relay D finally picks up, the closure of front contact 87 permits this charged capacitor 88 to discharge through resistor 89 and the winding of relay R so that relay R picks up. The time constant of this discharge circuit for capacitor 88 is also selected so that relay R will be picked up for approximately 100 milliseconds. One effect of the picking up of relay R is the closure of its front contact 67 which, as already mentioned, permits the erasure of the last-measured vehicle length from the output of amplifier 64. Another effect of the picking up of relay R is the charging of capacitor 90 through front contact 91 which then results in the picking up of relay C upon the release of relay R. This discharge circuit holds relay C picked up for approximately 100 milliseconds as shown also in FIGURE 6. The picking up of relay C for this relatively brief interval provides a momentary energization of a number of different counters as will shortly be described.

If the vehicle detected is a high vehicle which resulted in the actuation of relay HV and thus also of relay SP2, this will result in the picking up of the high vehicle memory relay HVM. The circuit for the energization of this relay includes back contact 92 of relay R and front contact 93 of relay SP2. Upon the picking up of relay HVM, its front contact 94 closes so that this relay can thereafter be released only upon the picking up of relay R which opens back contact 92. FIGURE 6 shows that relay ST picks up before relay R picks up and thus relay ST is picked up before there has been any opportunity for relay HVM to drop away in the event that the last vehicle was a high vehicle. Therefore, upon the picking up of relay ST and the closure of its front contact 96, a circuit is completed to energize the high vehicle storage relay HVS through this front contact 96 and through front contact 97 of relay HVM. Once relay HVS picks up, its own front contact 98 closes so that, when relay ST drops away shortly thereafter, a stick circuit is then completed to hold relay HVS picked up. Relay HVS has sufficient slow release characteristics that it will remain picked up and thus hold its front contact 98 closed throughout the changeover time of contact 96. Thereafter, relay HVS remains energized until relay ST is again picked up in response to the next passing vehicle. If such next vehicle is also a high vehicle, relay HVS will continue to stay picked up since relay HVM will then again become energized and the pick-up circuit for relay HVS will then once more be completed through front contacts 97 and 96. However, if such next vehicle is not a high vehicle, relay HVS will drop away because front contact 97 of relay HVM will then be open.

When relay C picks up in the manner already described, energy is applied through its front contact 99 to the all-vehicle counter 100. This counter advances one step for each such momentary energization and, since relay C is picked up for each passing vehicle, counter 100 will record the total number of vehicles which have been monitored. If the last vehicle was a low vehicle, relay HVS will be dropped away at the time that relay C picks up and this will then cause a pulse of energy to be applied through front contact 99 and back contact 101 of relay HVS to the low vehicle counter 102 so that this counter will record all low vehicles. On the other hand, if the last vehicle were a high vehicle, relay HVS would be picked up throughout the time of energization of relay C and this would cause energy to be applied instead through front contact 101 to the high vehicle counter 103 so that this latter counter will count only the high vehicles.

During the time that relay C is picked up and its front contact 99 closed, energy is also applied over wire 105 and through one or more of contacts 106, 107, or 108 of relays LV, MV and SV respectively, to one of the counters 109–111. If the vehicle detected was a long vehicle, for example, so that relay LV was picked up in response thereto, the pulse of energy on wire 105 would be applied through front contact 106 to actuate the long-vehicle counter 109 and thereby register a single count thereon. Although relays MV and SV would also be picked up at that time, the fact that back contact 106 was open would prevent either the medium-vehicle counter 110 or the short-vehicle counter 111 from receiving a pulse of energy. By analogy from the description already given, it will be apparent that the particular one of the counters 109–111 that is energized in response to the pulse of energy on wire 105 is dependent upon which of the relays LV, MV or SV was previously picked up. From FIGURE 6, it can be seen that the picking up of relay C does not occur until there has been sufficient time for a selected one of the relays LV, MV or SV to have been picked up in response to the detection of any particular vehicle, and thus the contacts of these relays 106–108 will all be in proper positions by the time relay C picks up.

Having described an apparatus and method for determining flow velocity and for classifying vehicles according to length, I wish it to be understood that various modifications, adaptations and alterations may be made to the specific forms shown without, in any manner, departing from the spirit or scope of my invention.

What I claim is:

1. Apparatus for measuring flow velocity of vehicular traffic comprising in combination, detector means continuously responsive to the presence of a vehicle in a defined detection zone, height responsive means differently responsive to vehicles having different heights and producing distinctive first and second signals for vehicles having heights respectively below and above a predetermined value, an operational amplifier having an input summing terminal and an output terminal, a first resistive input circuit for said amplifier responsive to said detector means and selectively connecting said summing point to a reference potential of predetermined polarity for a preselected first time period when any vehicle has been detected, a second resistive input circuit for said amplifier responsive to said height detection means for selectively connecting said summing point to said reference potential for a preselected second time interval when the vehicle detected by said detector means has a height above said predetermined value, said first and second time intervals being so related that their sum is to said first interval as the assumed average length of a truck is to the assumed average length of a passenger car, a resistive feedback circuit between said output and summing terminals of said amplifier being closed only throughout the time that said detector means detects the presence of a vehicle in said detection zone, and a capacitor connected between said output and summing terminals of said amplifier to store the output signal of said amplifier when no vehicle is present, whereby the output signal of said amplifier has an amplitude proportional to flow velocity.

2. Vehicle length measuring apparatus including the apparatus of claim 1 and further including integrating means responsive to the output of said operational amplifier over the length of time that said detector means detects the presence of a vehicle in said detection zone.

3. The vehicle length measuring apparatus of claim 2 which further includes a meter responsive to the output signal of said integrating means for providing a visual indication of vehicle length.

4. The apparatus of claim 2 including also a plurality of threshold detectors each coupled to the output of said operational amplifier and each being operative from its normal condition in response to a preselected value of the amplitude of said output, counting means corresponding to each said threshold detector, and means responsive jointly to said detector means and said threshold detectors for selectively operating a particular one of said counting means for each vehicle detected according to its length.

5. Apparatus for measuring vehicular flow velocity comprising in combination, an operational amplifier having an input summing terminal and an output terminal, means responsive to each vehicle detected for applying to said input summing point an electric charge of predetermined value, means for completing a resistive feedback circuit between said output terminal and said summing terminal for a time substantially equal to the time required for said vehicle to pass through a defined detection zone, and a storage capacitor connected between said summing point and said output terminal, whereby the amplitude of the output voltage appearing at said output terminal is proportional to the flow velocity.

6. The apparatus of claim 5 in which said responsive means includes vehicle height discrimination means, and amplifier control means governed by said height discrimination means for governing the amount of electric charge applied to said input summing point.

7. The apparatus of claim 6 in which said height discrimination means includes a first timing means demarcating a first predetermined interval upon the detection of any vehicle and a second timing means demarcating a second predetermined interval only upon the detection of a vehicle having a height above a particular level, said control means applying a first electric current to said input summing point during said first interval and a second current to said input summing point during said second interval.

8. Apparatus for generating an electrical signal whose amplitude is proportional to vehicle length comprising, first means governed according to the assumed average length of passing vehicles, second means governed according to the time of occupancy of each moving vehicle in a defined detection zone, circuit means governed jointly by said first and second means for generating a continuous signal whose amplitude is proportional to the flow velocity of traffic passing through said detection zone, and means for integrating the output signal of said circuit means over the time of occupancy of said detection zone by each individual vehicle, whereby the integrated output signal of said circuit means has its amplitude proportional to the length of said vehicle.

9. The apparatus of claim 8 wherein said first means is distinctively responsive to individual passing vehicles according to their height and applies to said circuit means a first signal when the height of the vehicle is less than a predetermined value and a second signal when the height of said vehicle is above said predetermined value, said first and second signals having the ratio of their amplitude-time integrals proportional to the assumed ratio of lengths of vehicles having heights respectively below and above said predetermined value.

10. Apparatus for measuring vehicular flow velocity comprising in combination, means responsive to the presence of a vehicle in a defined detection zone along a highway or the like for demarcating the occupancy time of said vehicle in said detection zone, means selectable in accordance with the lengths of vehicles passing through said detection zone for establishing for each detected vehicle a manifestation of vehicle length, storage means for storing a parameter whose magnitude is representative of flow velocity, means governed by said selectable means for adding to the stored parameter in response to each vehicle detected an amount substantially proportional to the then-existing vehicle length manifestation, means governed by said vehicle-responsive means for subtracting from the stored parameter in response to each vehicle detected an amount substantially proportional to the product of the flow velocity corresponding to the then-existing stored parameter multiplied by the occupancy time of said detected vehicle, and means responsive to the signal stored in said storage means.

11. The apparatus as claimed in claim 10 wherein said selectable means includes vehicle height responsive means for governing the value of the vehicle length manifestation in accordance with the known statistical relationship between vehicle height and vehicle length.

12. Apparatus for measuring vehicular flow velocity comprising in combination, means responsive to the presence of a vehicle in a defined detection zone along a highway or the like for demarcating the occupancy time of said vehicle in said detection zone, means selectable in accordance with the lengths of vehicles passing through said detection zone for establishing for each detected vehicle a manifestation of vehicle length, storage means for storing a parameter whose magnitude is representative of flow velocity, means governed by said selectable means for adding to the stored parameter in response to each vehicle detected an amount substantially proportional to the then-existing vehicle length manifestation, means governed by said vehicle-responsive means for subtracting from the stored parameter in response to each vehicle detected an amount substantially proportional to the time integral of the flow velocity value represented by said stored parameter and with the integration taking place over the duration of the detection zone occupancy time, and means responsive to the signal stored in said storage means.

13. Apparatus for measuring vehicular flow velocity comprising in combination, means responsive to the presence of a vehicle in a defined detection zone along a highway or the like for demarcating the occupancy time of said vehicle in said detection zone, first means governed in accordance with the lengths of vehicles passing through said detection zone for providing for each detected vehicle at least an approximate manifestation of its length, a capacitor for storing electrical charge in an amount which is representative of flow velocity, second means controlled by said first means for adding in response to each vehicle detected an amount of charge to that already stored in said capacitor which is substantially proportional to the length of said vehicle, means governed by said vehicle-responsive means for subtracting in response to each vehicle detected an amount of charge from that already stored in said capacitor which is substantially proportional to the product of the flow velocity equivalent of the then-existing stored charge and the vehicle occupancy time, and means responsive to the signal stored in said storage means.

14. Apparatus for measuring vehicular flow velocity comprising in combination, means responsive to the presence of a vehicle in a defined detection zone along a highway or the like for demarcating the occupancy time of said vehicle in said detection zone, signal accumulating means, means for adding a predetermined amount of signal to the signal stored in said signal accumulating means for each vehicle detected by said vehicle responsive means and for also subtracting from said signal stored in said signal accumulating means an amount of signal proportional to the occupancy time of each said vehicle in said detection zone and proportional also to the present value of said signal, and means for time-averaging the magnitude of the signal in said signal accumulating means for providing a resulting signal whose magnitude is representative of flow velocity.

15. Apparatus for measuring vehicular flow velocity comprising in combination, means responsive to the presence of a vehicle in a defined detection zone along a highway or the like for demarcating the occupancy time of said vehicle in said detection zone, signal accumulating means, means controlled by said vehicle responsive means for adding to the signal stored in said accumulating means over any interval an amount of signal proportional to the number of vehicles detected by said vehicle responsive means in said interval and for also subtracting from said signal in said accumulating means an amount of signal proportional to the cumulative vehicle detection periods demarcated by said vehicle responsive means throughout such interval and proportional also to the value of said signal.

16. Apparatus for measuring vehicle flow velocity comprising in combination, means responsive to the presence of a vehicle in a defined detection zone along a highway or the like for demarcating the occupancy time of said vehicle in said detection zone, signal accumulating means, first means responsive to each vehicle detected by said vehicle responsive means for adding a predetermined amount of signal to said signal stored in said signal accumulating means and for also subtracting from said signal in said signal accumulating means an amount of signal proportional to the occupancy time of each said vehicle in said detection zone and also proportional to the value of said signal, output means operatively connected to said signal accumulating means and responsive to the value of the signal stored therein for producing an output manifestation representative of flow velocity, and means for controlling the relationship between said predetermined amount of signal added to said signal accumulating means for each detected vehicle and the flow velocity manifestation produced by said output means.

17. Apparatus for measuring vehicular flow velocity comprising in combination, means responsive to the presence of a vehicle in a defined detection zone along a highway for demarcating the occupancy time of said vehicle in said detection zone, signal accumulating means for storing a signal in an amount representative of flow velocity, means controlled by said vehicle responsive means for adding to said accumulating means in response to each vehicle detected a uniform quantum of signal, means governed by said vehicle responsive means for subtracting in response to each vehicle detected an amount of signal from that already stored in said accumulating means which is substantially proportional to the product of the flow velocity equivalent of the then-existing stored charge and the vehicle occupancy time, and means responsive to the amplitude of signal stored in said accumulating means.

18. A traffic flow velocity computer comprising vehicle detecting means, signal integrating means having an input and an output, switching means responsive to each detection of a vehicle by said vehicle detecting means for applying a predetermined discrete quantity of signal to said input of said integrating means, means also responsive to said vehicle detecting means for decreasing the amount of signal in said integrating means for each vehicle detected an amount substantially proportional to the product of the existing value of signal in said integrating means and the length of the interval in which such vehicle is sensed by said vehicle detecting means, and means responsive to the amplitude of the signal at the output of said integrating means for providing a manifestation of flow velocity.

19. A traffic speed computer comprising vehicle detecting means, integrating means having an input and an output, means responsive to said vehicle detecting means for producing a predetermined discrete quantity of electrical signal upon each detection of a vehicle by said vehicle detecting means and for coupling said responsive means to said input for each such vehicle detected, and switching means also responsive to said vehicle detecting means for coupling said input of said integrating means to the output of said integrating means through an electrical impedance during the entire interval in which the vehicle is sensed by the vehicle detecting means.

References Cited by the Examiner
UNITED STATES PATENTS

| | | | |
|---|---|---|---|
| 2,789,761 | 4/1957 | Merril et al. | 235—183 XR |
| 3,185,959 | 5/1965 | Barker | 235—150.24 |

MALCOLM A. MORRISON, *Primary Examiner.*

K. W. DOBYNS, C. L. WHITHAM, *Assistant Examiners.*